June 18, 1963  W. E. RENICK  3,093,892
METHOD OF MAKING AN ADJUSTABLE ORIFICE
Original Filed Aug. 27, 1957  3 Sheets-Sheet 1

INVENTOR.
WENDELL E. RENICK
BY Donald J. Detrick

June 18, 1963

W. E. RENICK 3,093,892

METHOD OF MAKING AN ADJUSTABLE ORIFICE

Original Filed Aug. 27, 1957

*INVENTOR.*
WENDELL E. RENICK

BY Donald J. Dietrich

June 18, 1963 W. E. RENICK 3,093,892
METHOD OF MAKING AN ADJUSTABLE ORIFICE
Original Filed Aug. 27, 1957 3 Sheets-Sheet 3
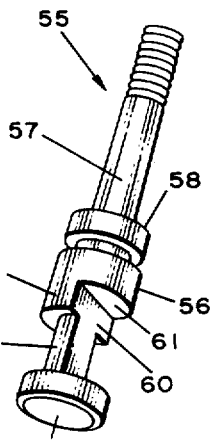
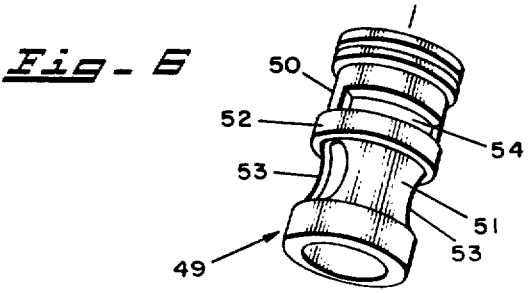
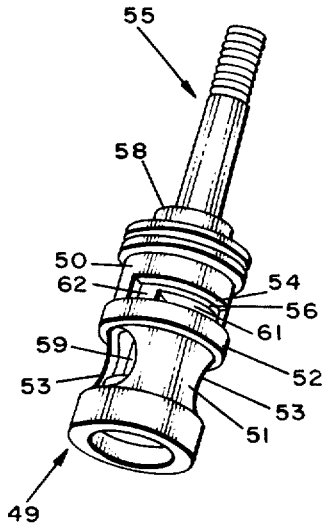
INVENTOR.
WENDELL E. RENICK
BY Donald J. Detrich United States Patent Office 3,093,892
Patented June 18, 1963

3,093,892
METHOD OF MAKING AN ADJUSTABLE ORIFICE
Wendell E. Renick, Columbus, Ohio, assignor to American Brake Shoe Company, New York, N.Y., a corporation of Delaware
Original application Aug. 27, 1957, Ser. No. 680,596, now Patent No. 2,936,152, dated May 10, 1960. Divided and this application Sept. 29, 1958, Ser. No. 763,858
4 Claims. (Cl. 29—157.1)

This invention relates generally to fluid flow control devices and its main object is to provide an improved method of making structure which forms an adjustable orifice in a fluid flow control device.

A more specific object of the invention is to provide an improved method of making an improved structure which forms an adjustable orifice in a fluid flow control device which orifice structure includes a cylindrical sleeve adapted to be received in a bore in the body of the control device and which sleeve includes a pair of passage means extending through its walls to its bore and in which bore there is movably fitted a shaft having a notch in one side that conducts fluid between the mentioned passage means, hydraulically balances the shaft axially within the bore and cooperates with the outside surface of the shaft to provide edges or shoulders and surfaces by which the area of one of said passage means may be changed to form an adjustable orifice.

In carrying out the foregoing object, it is a further object of the invention to provide an improved method of making an orifice structure by which the sleeve is provided with spaced circumferential grooves which are connected to the bore of the sleeve by the mentioned pair of passages, the grooves permitting the bore in which the sleeve is received to be free of annular fluid conducting grooves and the like thereby simplifying the construction of the flow control device of which the orifice means forms a part.

Another object of the invention is to provide an improved method of making a structure for forming an adjustable orifice in a fluid flow control device which means includes a sleeve having an opening through its wall and a shaft movably fitted within the sleeve and having a notch adapted to cooperate with said opening to provide an adjustable orifice, and which opening and notch are each formed by a milling operation resulting in the formation of sharp edges on the walls of the sleeve and the notch in the shaft which sharp edges cooperate to define the periphery of the adjustable orifice.

Further objects and advantages of the present invention will be apparent from the following description, references being had to the accompanying drawings wherein a preferred form of embodiment of the invention is clearly shown.

In the accompanying drawings:

FIG. 1 is a diagrammatic showing of a hydraulic system for operating a hydraulic motor or ram, the showing including a view in section taken on line 1—1 of FIG. 2 of a hydraulic fluid flow control valve incorporating orifice forming means which includes features of the invention, this view of the flow control valve showing particularly the pressure differential operated pressure compensating mechanism of the valve;

FIG. 5 is a view in perspective of the shaft element of the adjustable orifice forming means;

FIG. 6 is a view in perspective of the sleeve element of the adjustable orifice forming means;

FIG. 7 is a view in perspective of the shaft and sleeve seen in FIGS. 5 and 6, respectively, in assembled condition.

This application is a division of my application Serial No. 680,596 filed August 27, 1957, now Patent No. 2,936,152 for "Structure Forming an Adjustable Orifice."

Figure 1:
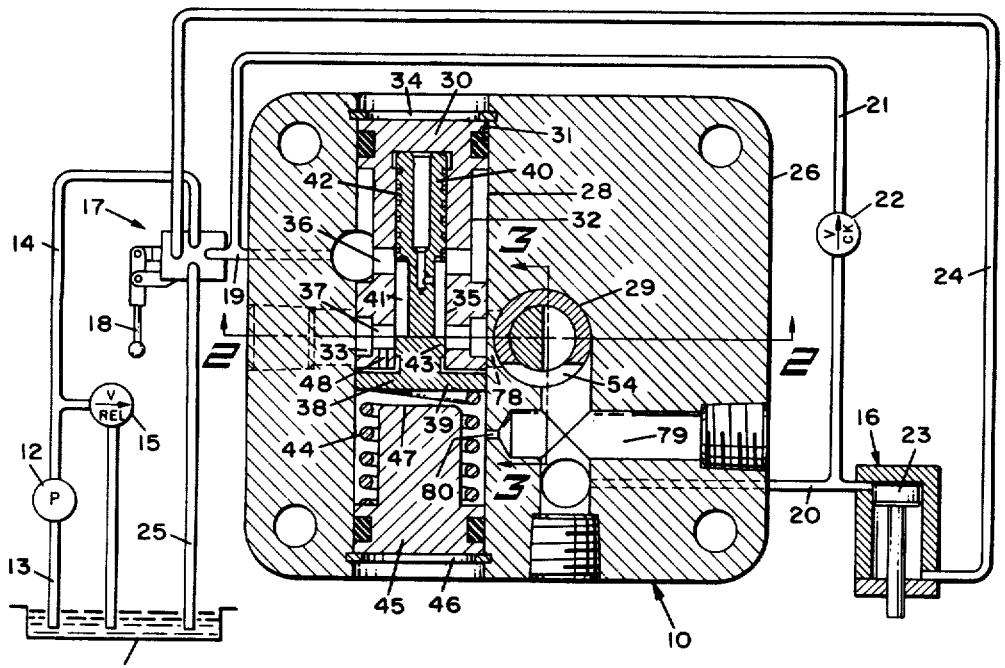
Figure 2:
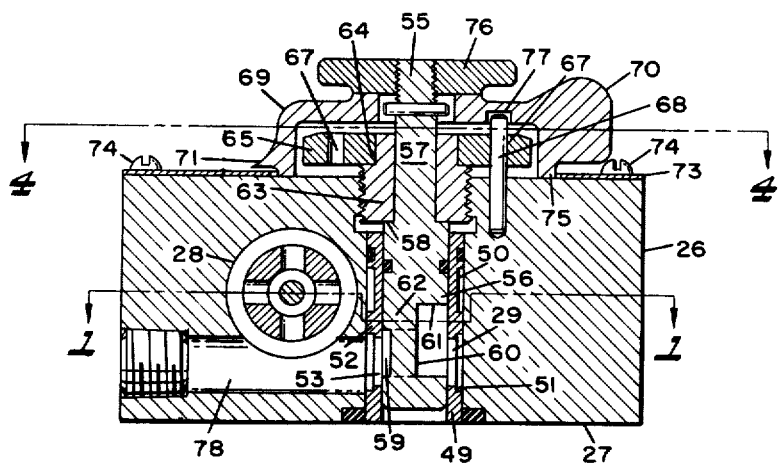
FIG. 2 is a view in section of the valve described in FIG. 1, the view being taken on line 2—2 thereof and showing particularly the mechanism thereof which forms an adjustable orifice in the valve and the adjusting mechanism by which this adjustable orifice is adjusted in two directions and is held in the position to which it is adjusted.
Figure 3:
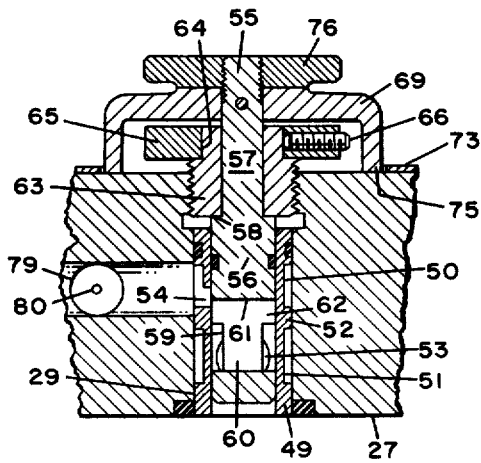
FIG. 3 is a view in section, the section being taken on line 3—3 of FIG. 1.

In FIG. 1 of the drawings, there is shown a hydraulic circuit or system which includes an adjustable volume constant flow control valve 10 in which there is incorporated an adjustable orifice forming means which includes the features of the invention. The hydraulic circuit includes a reservoir or tank 11 for hydraulic fluid, a pump 12 which receives fluid from the tank 11 through a conduit 13 and discharges fluid under pressure into a conduit 14. Conduit 14 is connected to tank 11 through a relief valve 15. The tank, pump, etc. thus far described constitute a source of fluid under pressure by which a hydraulic ram or motor 16 is operated.

The high pressure conduit 14 is connected to the inlet port of a manually operated directional flow control valve 17. Valves similar to the valve 17 are well known in the art and, therefore, this valve is not shown in detail. The valve 17 illustrated includes a manual control handle or lever 18. When the lever 18 is in the position shown, the conduit 14 is blocked at the valve 17 and the entire output of fluid from the pump 12 is by-passed through the relief valve 15 to tank 11. When the lever 18 is shifted in one direction from the position illustrated, the conduit 14 is connected to a conduit 19 leading to valve 10 and fluid will flow through this latter valve to a conduit 20 connected to the top of the ram or motor 16. Conduits 19 and 20 are interconnected by a by-pass conduit 21 which includes a check valve 22 that prevents fluid from flowing from the conduit 19 to conduit 20 but which permits substantially free flow in the opposite direction, that is, from the conduit 20 to the conduit 19. The purpose of this by-pass 21, 22 in the reverse direction is fully set forth hereinafter.

Hydraulic fluid under pressure which is directed to the top of the cylinder of the ram or motor 16 forces the piston 23 thereof downwardly and displaces hydraulic fluid from the bottom of the cylinder. The displaced fluid flows through a conduit 24 to the valve 17 and through a conduit 25 to the tank 11.

When the lever 18 is shifted in the opposite direction from the position illustrated, conduit 14 is connected to conduit 24 and conduit 19 is connected to tank. Under these conditions, hydraulic fluid from the source of pressure flowing in conduit 14 flows through conduit 24 to the bottom of the ram or motor 16 and forces the piston 23 thereof upwardly displacing fluid from above the piston and through the conduit 20, the by-pass conduit 21 and check valve 22 to the valve 17 from which it is directed through the conduit 25 to tank 11. The conduit 21 and check valve 22 may be, and preferably are, contained within the body 26.

From the foregoing, it will be seen that hydraulic fluid flowing to the top of the ram or motor 16 must flow through the adjustable volume constant flow control valve 10 but that when the direction of flow is reversed, the hydraulic fluid flowing from the top of the ram or motor 16 can by-pass the valve 10 at low pressure by passing through the conduit 21 and check valve 22.

The adjustable volume constant flow control valve 10 is included in the hydraulic circuit or system for causing hydraulic fluid to be admitted to the top of the ram or motor at a constant volume at any of its volumetric adjustments regardless of fluctuations either in the high pressure supply conduit 19 leading thereto or in the conduit 20 leading therefrom and to the top of the ram or motor 16.

The adjustable volume constant flow control valve 10 includes a body 26 in the form of a rectangular block having a base or bottom surface 27 adapted to be mounted, as by clamping, upon a sub-plate mount, not shown. It may be mentioned that it is now common practice in the art to mount valves, motors, pumps, etc. by the sub-plate method and that one of the numerous advantages of such mounting is found in the fact that it permits the expedient connection of the inlet and outlet ports of the devices to corresponding ports or passages in the sub-plate with only the need of simple sealing means which may be in the form of O-rings or flat gaskets therebetween.

The body 26 is provided with two through bores 28 and 29 the axes of which extend at right angles to each other and are spaced apart. The axis of bore 28 is parallel with the bottom or base surface 27 of the body and it contains elements which cooperate to form the pressure compensating means of the valve 10. These elements include a cylindrical element 30 having spaced circumferential grooves 31, 32 and 33 formed therein which is inserted into one of the open ends of bore 28 and is retained therein by a snap ring 34. The cylinder 30 is sealed to the bore 28 by an O-ring contained within the groove 31 which is adjacent the snap ring 34. Cylinder 30 also includes a central axially extending cylinder or bore 35 which is connected to the grooves 32 and 33 by passages or ports 36 and 37, respectively.

A compound piston element 38 is also contained within the bore 28 and this element includes a piston head 39 and a small diameter hollow piston portion 40 which extends into and reciprocates in the cylinder or bore 35. This small diameter hollow piston portion 40 includes a circumferential groove 41 and a pair of lands 42 and 43. The land 42 cooperates with the ports or passages 36 to form a valve for controlling the flow of fluid through the ports or passages 36 in accordance with the axial position of the sharp peripheral edge of the land 42 which is adjacent the groove 41. Land 43 functions merely as a guide or bearing for the compound piston element 38 and it never closes the ports or passages 37. The hollow interior of the piston portion 40 is connected through a lateral drilling with the groove 41 in order that fluid may flow from this groove 41 through the piston portion 40 and to the chamber formed by its free end and the upper closed end of the cylinder or bore 35.

The piston head 39 is of such diameter as to sealingly slide in the bore 28 in the valve body 26 and the entire piston 38 is urged upwardly to the position shown in FIG. 1 of the drawings by a spring 44 which abuts the piston head 39 and a plug 45. Plug 45 is inserted into the other open end of bore 28 and is sealed thereto by an O-ring. A snap ring 46 retains the plug 45 in the bore 28. The plug 45 forms an abutment 47 which limits the downward movement of the piston 38 in the bore 28. The chamber formed in the bore 28 between the upper face of the piston head 39 and the adjacent end of the cylindrical element 30 is connected with the groove 37 by a passage 48 formed in the cylindrical element and extending from one of the ports or passages 37 to the bottom of the element 30.

The through bore 29 contains mechanism which cooperates to form an adjustable or variable orifice by which the rate of flow of fluid to the exhaust port 20 of the constant volume flow control valve assembly 10 is controlled. The elements which cooperate to form this orifice include a liner, sleeve or thimble 49 which is contained within the bore 29 and has a close sealing fit therewith. This liner sleeve 49 is provided with two circumferential grooves 50 and 51 which are separated by a land 52 and its upper end is further sealed to the bore 29 by an O-ring. As seen in the drawings, this O-ring is contained within a groove formed in the liner sleeve 49. Another O-ring lies in a groove formed in the body 26 which surrounds the liner sleeve. This latter O-ring is retained in its groove by the sub-plate, not shown, and seals the body 26 to the sub-plate.

Groove 51 in liner sleeve 49 is connected at all times to the interior of the sleeve 49 by passage means in the form of a pair of bores or holes 53 formed through the walls of the sleeve 49 and groove 50 is connected to the interior of the liner sleeve by a rectangular slot 54 which is formed through the wall of the sleeve by a milling operation whereby the peripheral surfaces of the slot 54 where it joins the interior or bore of the liner sleeve will be provided with sharp edges.

The interior or bore of the liner sleeve 49 is cylindrical and it receives a valve element 55 which is adjustable therein both axially or longitudinally and rotationally. This element 55 is a shaft having two cylindrical portions 56 and 57 of different diameters separated by a shoulder 58. The larger diameter portion 56 of shaft 55 fits closely but movably in the interior of the liner sleeve 49 and it is provided with a circumferential groove adjacent the shoulder 58 in which there is an O-ring for preventing the loss of fluid along the shaft 55 toward the shoulder 58. As seen in the drawings, the lower end of the portion 56 of shaft 55 is provided with a circumferentially extending groove 59 which is open to the bores or holes 53 in the liner sleeve 49 at all times and this groove 59 joins or is intersected by a notch or slot 60 milled in the shaft and extending at right angles to the axis thereof. The depth of notch or slot 60 is such that the bottom of the slot lies substantially on the longitudinal axis of the shaft 55 and the notch or slot is of greater width, i.e., it has a greater axial dimension than groove 59. As clearly seen in the drawings, the lowermost side wall of notch or slot 60 lies in the same plane as the lowermost side wall of groove 59 and because the axial dimension of the notch or slot 60 is greater than the width of groove 59 the uppermost side wall 61 of the slot 60 lies in a plane above the plane of the uppermost side wall of groove 59 to provide a solid semicircular shaft portion 62 having sharp edges where it joins the walls of the notch or slot 60 and which, upon rotary adjustment of the shaft 55, serves to adjust the length of the adjustable orifice of the control valve 10 formed by it and the rectangular slot 54 in the manner hereinafter described in detail.

Figure 4:
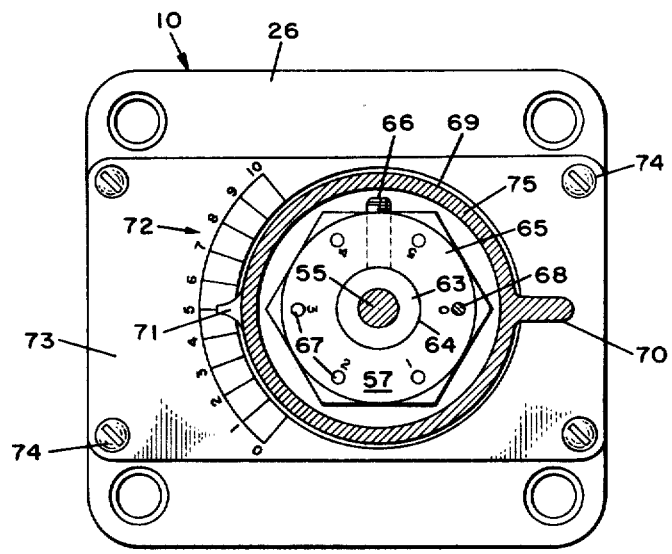
FIG. 4 is a view in plan of the control valve seen in FIGS. 1 and 2 with parts in section, the section being taken on line 4—4 of FIG. 2.

As previously mentioned, the valve element or shaft 55 is adjustable both axially or longitudinally and rotationally in the liner sleeve 49 and the means for adjusting the shaft in these manners includes a bushing or sleeve 63 which receives the small diameter or stem portion 57 of the shaft 55 and which abuts the shoulder 58 of the latter. The bushing or sleeve 63 is externally threaded to be received by internal threads formed in the body 26 at one end of the through bore 29 and its uppermost end provides a cylindrical surface 64 upon which there is rotationally mounted an adjusting means in the form of a hexagonal index plate 65. Index plate 65 may be locked to the cylindrical portion of the bushing or sleeve 63 by a set screw 66. As clearly seen in FIG. 4 of the drawings, the index plate 65 is provided with six equally spaced bores or holes 67 through any one of which a pin 68 may be inserted. The pin 68 is received in a bore in the body 26 and its uppermost end projects above and beyond the top surface of the plate 65 to provide a stop means for a dial 69 which forms a cup shaped cover for the adjusting mechanism just described. While I have shown the index plate 65 as including six of the bores or holes 67, it is to be understood that more or less of these holes or bores may be provided if desired.

The cup shaped dial or cover 69 is employed to adjust the shaft 55 to different rotational positions and it includes a wing 70 opposite a pointer 71 which cooperates with indicia 72 on a plate 73 which is secured to the body 26 by screws 74. The dial 69 is mounted upon the stem portion 57 of shaft 55 and is held thereto against rotation by a roll pin which extends through the shaft and is received in a slot in the dial. The circular lip 75 of the dial is flat and it can be clamped against the body 26 by a knurled nut 76 which is threaded on the end of shaft 55. The uppermost end of pin 68 extends into an arcuate slot 77 formed in the bottom of the dial 69 and the ends of this slot 77 form abutments which engage the pin 68 to determine the limits of rotation of the dial 69.

Figure 8:
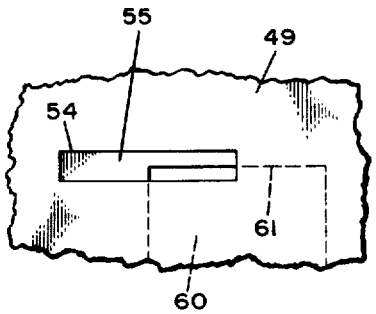
FIG. 8 is a diagrammatic view illustrating the manner in which the adjustable orifice formed by the shaft and sleeve is adjusted in two directions, namely width and length.

As is evident from the foregoing description, the adjustable or variable orifice of the adjustable volume constant flow control valve 10 is formed by the milled rectangular slot 54 in the liner or sleeve 49 and the milled slot 60 in the shaft 55 and the relative positions to which these elements are adjusted determines the effective size or open area of the orifice. These elements are shown diagrammatically in FIG. 8 of the drawings, and, with reference to this drawing, it will be seen that when the upper side wall 61 of the slot 60 is adjusted axially or longitudinally (upwardly or downwardly as seen in FIG. 8) that the effective width of the slot 54 will be changed. It will also be apparent that when the shaft 55 is rotated (moved to the right or left as seen in FIG. 8) that one or the other ends of the notch or slot 60 and the semi-cylindrical shaft portion 62 will function to adjust the effective length of the slot 54.

The width to which the orifice is adjusted determines the range of flow, for example in gallons per minute, through the orifice and the length to which the orifice is adjusted determines the volumetric flow in any of the ranges. For example, assume that the width of the orifice is adjusted or set to permit a maximum flow of five gallons of fluid per minute through the valve, then the length of the orifice may be adjusted to permit any flow of fluid from zero up to the maximum predetermined by the setting or adjusted width of the orifice.

In the apparatus herein described, the width of the adjustable orifice is, of course, adjusted by shifting the shaft 55 to different axial positions, and in the apparatus illustrated the effective open width of the orifice may be adjusted to any one of different widths as predetermined by the rotation of the bushing or sleeve 63 and the number of holes 67 in the plate 65.

In adjusting the relative positions of the elements to predetermine the range adjustments, the bushing or sleeve 63 is rotated to that position wherein it forces the shaft 55 downwardly just to the point wherein the adjustable orifice is closed and no fluid can flow through it. The set screw 66 is then loosened and the index plate 65 is rotated to such position that the pin 68 can be inserted through the hole 67 therein marked 0. The pin 68 is then inserted through this hole into the bore in the body 26 and the set screw 66 is tightened to interlock the index plate 65 and the bushing or sleeve 63. Once the valve has been "zeroed" in the manner described, if it is desired to adjust the orifice to the first range the pin 68 is withdrawn from the index plate 65 and body 26 and the index plate is rotated until the hole 67 therein marked 1 aligns with the pin bore in the body and the pin 68 is replaced. The orifice may be adjusted to any other of the ranges indicated by the holes 67 marked 2 through 5 in the same manner.

It is understood, of course, that since the dial 69 forms a cover for the range adjusting mechanism described that it must be removed from the shaft 55 in order to gain access to the range adjusting mechanism.

After the range adjusting mechanism described has been adjusted to or set in the desired range in the manner described, the dial 69 and nut 76 are placed upon the shaft 55 and nut 76 is tightened to draw the shoulder 58 against the bushing or sleeve 63. In order to adjust the volume in that range to which the orifice has been set, the shaft is rotated to the desired position as indicated by the pointer 71 and indicia 72 and the nut is tightened. Tightening of the nut 76 draws the shoulder 58 of shaft 55 against the end of the bushing or sleeve 63 and it clamps the dial 69 against the body 26 to lock the shaft 55 in its adjusted position.

In operation, the path of fluid flow through the adjustable volume constant flow control valve 10 is from the high pressure conduit 19 to the circumferential groove 32 and from this groove 32 through the passages or ports 36 to the circumferential groove 41 in small diameter piston portion 40 of piston 38. From groove 41, the fluid flows through the ports or passages 37 to groove 33 which is connected to a passage 78 leading to the bores or holes 53 in liner sleeve 49. From the bores or holes 53, the fluid passes into the slot 60 in shaft 55 and upwardly in this slot to the adjustable or variable orifice formed by the slot 54 and groove 60. From this orifice, the fluid flows through a passage 79 to the outlet or exhaust conduit 20 of the hydraulic system.

As previously indicated, when the adjustable volume constant flow control valve 10 is operating, it will maintain a constant volumetric flow at its exhaust port or conduit 20 regardless of pressure fluctuation therein or in its input port or conduit 19. It is the pressure compensator mechanism which is responsible for this action and it is the variable orifice that predetermines what the volumetric flow through the valve shall be.

In the operation of the pressure compensator mechanism, the compound piston element 38 is urged to the position shown in FIG. 1 of the drawings by the spring 44 to open the valve formed by the ports 36 and the sharp bottom edge of the land 42 of the piston portion 40. The fluid flowing through this valve enters the groove 41 and flows to the adjustable or variable orifice. The pressure of this fluid is applied from the groove 41 to the top of the small diameter piston portion 42 and from the groove 41 through the ports 37 and 48 to the upper piston area of the head 39. (For the purposes of this explanation, the total area just described will be assumed to be one square inch.) Assuming that the adjustable orifice is closed and that the spring 44 exerts an upward force of thirty-five pounds upon the compound piston 38, as the pressure builds up in the groove 41 it acts on the total piston area described to compress the spring and close the valve formed by the ports 36 and the lower sharp edge of the top land 42. It will thus be seen that the force of the pressure in the groove 41 will always be equal to the force of the spring 44 plus any force which may assist the spring. In other words, since the piston 38 is pressure balanced and urged in one direction by the spring 44 with a force of thirty-five pounds, the two forces will always be equal. Having assumed that the area of each end of the piston 39 is one square inch, it will be seen that the pressure acting on the spool in opposition to spring 44 will equal thirty-five pounds per square inch.

When the adjustable orifice is opened, fluid will begin to flow through it from the groove 41 and the pressure in said groove will be maintained due to the action of the compensator mechanism. In this action, the spring 44 will move the piston 38 upwardly to open the valve at 36 sufficiently to maintain a pressure in the groove 41 equal to the force of the spring. It is well known that when fluid is forced through an orifice that there is created a pressure drop or difference in pressures between the fluid on the inlet side of the orifice and the pressure of the fluid on the outlet side of the orifice. In the present instance, the higher of these pressures is on the inlet side of the orifice and is reflected to the groove 41. The lower of these pressures is on the outlet side of the orifice and is reflected through a passage 80 to the bore 28 and the bottom of the piston head 39. This lower pressure is applied to the piston head 39 to aid the spring 44 in urging the piston 39 to open the valve at 36.

It will thus be seen that regardless of the adjustment of the effective open area of the adjustable orifice that the difference in pressures between its high pressure side and its outlet or low pressure side will always be maintained constant and equal to the force of the spring divided by the area of one end of the compound piston 38.

From the foregoing description, it will be seen that the construction of the adjustable volume constant flow control valve 10 is simplified because its body 26 need only be provided with the uniform diameter bore 29 to receive the sleeve 49 of the adjustable orifice forming means and that this bore need not be provided with the customary annular grooves for conducting fluid through the body 26 to and from the passages 53 and 54 in the sleeve since this is the function of the grooves 50 and 51. It will also be seen that because of this simplified construction that the orifice forming means or slot 54 included in the sleeve 49 may be readily changed or renewed simply by replacing the sleeve 49.

The features of this invention reside in the method of making the elements of the orifice forming assembly and in this method the sleeve 49 is formed by first providing a cylindrical sleeve, then grinding or turning the grooves 50 and 51 therein and finally by milling the slot 54 and forming the bores or holes 53 therein. The steps of forming the shaft element 55 of the orifice forming means include turning or grinding its outside or circumferential surface to form a two diameter element including the cylindrical portions 56 and 57 and turning the groove 51 therein after which the notch or slot 60 is milled therein.

It will be seen that when the sleeve 49 and shaft 55 are assembled to form the adjustable orifice that the notch or slot 60 will function to balance the shaft 55 axially hydraulically within the sleeve, that it forms a passage for conducting fluid between the passages 53 and 54 in the sleeve and that its sharp edges where it joins the cylindrical surface 62 together with the surface 62 cooperate with the sharp edges of the slot 54 at the interior or bore of the sleeve to form a rectangular orifice the area of which may be adjusted by moving the shaft either axially or longitudinally, or by rotating the shaft within the sleeve.

While the form of embodiment of the present invention as herein disclosed constitutes a preferred form, it is to be understood that other forms might be adopted, all coming within the scope of the claims which follow.

I claim:

1. The method of making an adjustable orifice forming means for use in a fluid flow control device, said method including the steps of forming a cylindrical sleeve; forming two circumferential grooves in the exterior of said sleeve; forming a passage from one of said grooves to the interior of said sleeve; milling a rectangular slot having its major axis extending transversely of the longitudinal axis of said sleeve to form an opening between the other of said grooves and the interior of said sleeve and to provide sharp edges where said slot joins the interior of said sleeve; forming a solid shaft having a close movable fit with the interior of said sleeve; forming a circumferentially extending groove in the exterior of said shaft, milling a notch in one side of said shaft, said notch having an axial dimension greater than said groove and joining the latter, said notch also providing sharp edges on the exterior of said shaft for cooperating with the sharp edges of said slot to form an adjustable orifice and for conducting fluid between said slot and passage, inserting said shaft in said sleeve and retaining said shaft for adjustment relative to said sleeve.

2. The method of making an adjustable orifice forming means for use in a fluid flow control device, said method including the steps of forming a cylindrical sleeve; forming a passage in the wall of said sleeve connecting its exterior and interior; milling a rectangular slot having its major axis extending transversely of the longitudinal axis of said sleeve to form an opening between the exterior and interior of said sleeve provided with sharp edges where said slot joins the interior of said sleeve; forming a solid shaft having a close movable fit with the interior of said sleeve; forming a circumferentially extending groove in the exterior of said shaft, milling a notch in one side of said shaft, said notch having an axial dimension greater than said groove and joining the latter, said notch also providing sharp edges on the exterior of said shaft for cooperating with the sharp edges of said slot to form an adjustable orifice and for conducting fluid between said slot and passage, inserting said shaft in said sleeve and retaining said shaft for adjustment relative to said sleeve.

3. The method of making an adjustable orifice forming means for use in a fluid flow control device, said method including the steps of forming a cylindrical sleeve; forming a passage in the wall of said sleeve connecting its exterior and its interior; milling a rectangular slot having its major axis extending transversely of the longitudinal axis of said sleeve to form an opening between the exterior and interior of said sleeve provided with sharp edges where said slot joins the interior of said sleeve; forming a solid shaft having a close movable fit with the interior of said sleeve, and milling a notch in one side of said shaft providing sharp edges at the exterior of said shaft for cooperating with the sharp edges of said slot in said sleeve to form an adjustable orifice and to conduct fluid between said slot and pasasge, inserting said shaft in said sleeve and retaining said shaft for adjustment relative to said sleeve.

4. The method of making an adjustable orifice forming means for use in a fluid flow control device, said method including the steps of forming a cylindrical sleeve; forming a passage in the wall of said sleeve connecting its exterior and its interior; milling a rectangular slot to form an opening between the exterior and interior of said sleeve provided with sharp edges where said slot joins the interior of said sleeve; forming a solid shaft having a close movable fit with the interior of said sleeve, and milling a notch in one side of said shaft providing sharp edges at the exterior of said shaft for cooperating with the sharp edges of said slot in said sleeve to form an adjustable orifice and to conduct fluid between said slot and passage, inserting said shaft in said sleeve and retaining said shaft for adjustment relative to said sleeve.

References Cited in the file of this patent

UNITED STATES PATENTS

| | | |
|---|---|---|
| 2,016,878 | Vickers | Oct. 8, 1935 |
| 2,684,828 | Roberts | July 27, 1954 |
| 2,846,848 | Coker | Aug. 12, 1958 |
| 2,848,186 | Bayer | Aug. 19, 1958 |
| 2,891,573 | Dobleske | June 23, 1959 |